United States Patent [19]

Volk et al.

[11] 4,216,565
[45] Aug. 12, 1980

[54] MEAT STRIPPING MACHINE FOR FOWL

[75] Inventors: Anthony J. Volk, 1232 South Ave., Turlock, Calif. 95380; Robert Groh, Turlock, Calif.

[73] Assignee: Anthony J. Volk, Turlock, Calif.

[21] Appl. No.: 15,473

[22] Filed: Feb. 26, 1979

[51] Int. Cl.² ...................... A22C 17/04; A22C 21/00
[52] U.S. Cl. .......................................... 17/1 G; 17/46
[58] Field of Search ............................. 17/1 G, 46, 11

[56] References Cited

U.S. PATENT DOCUMENTS

| 3,457,586 | 7/1969 | Zwiep et al. | 17/1 G |
| 3,866,271 | 2/1975 | McNeil | 17/46 X |

Primary Examiner—Willie G. Abercrombie
Attorney, Agent, or Firm—Alvin E. Hendricson

[57] ABSTRACT

A machine for automatically stripping the meat from a turkey leg or the like, has retaining means for gripping the leg and leg tendons adjacent the hocks and radially disposed stripping knives are driven longitudinally of the leg while being radially adjusted for following the bone contour to strip the meat from the bone and tendons.

6 Claims, 11 Drawing Figures

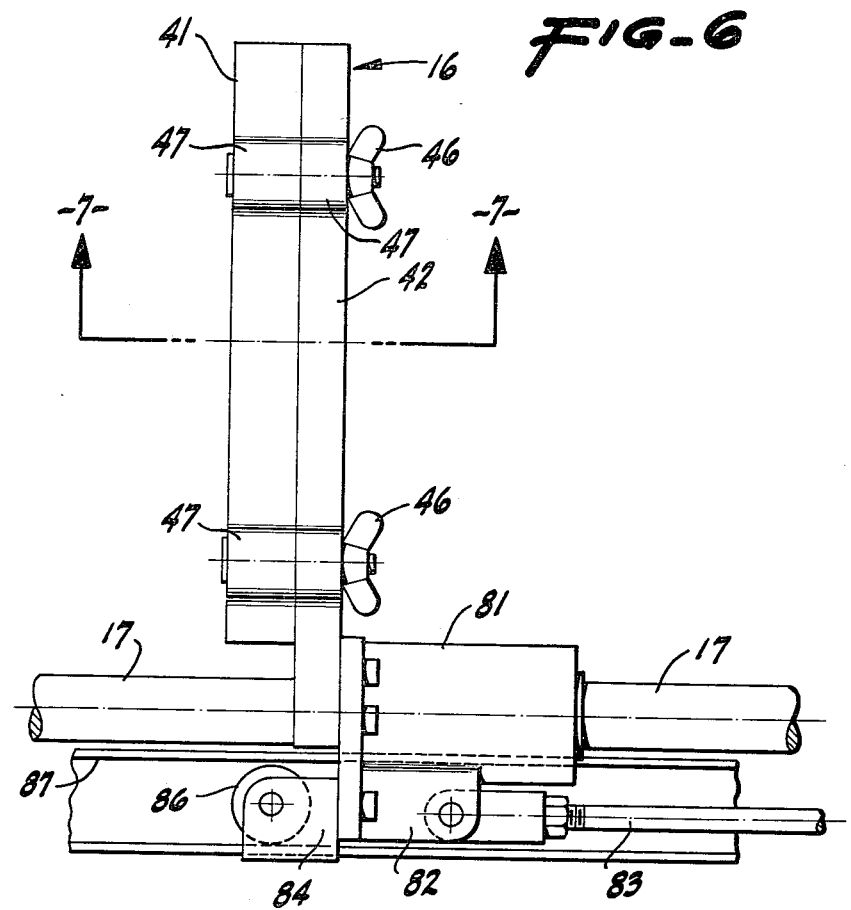
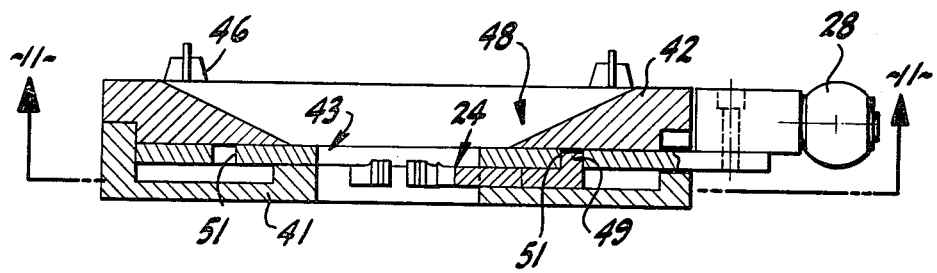

MEAT STRIPPING MACHINE FOR FOWL

BACKGROUND

It is known to manually slice and strip meat from turkey legs, for example, in order to further process the meat. The production of ground turkey meat and turkey sausage is becoming more widespread with the large scale production of quite large birds and the consequent economically favorable relation of turkey meat to other meats. Thus separation of the meat from bones and tendons is becoming a major operation.

One of the problems encountered in the removal of meat from a turkey leg or the leg of other fowl is the presence of numerous tendons and the like, which need to be separated from the meat. Conventional stripping means employed for removing beef from bones are not applicable as the knives thereof are normally moved normal to the bone and in radial and rotary fashion which would either cut up the tendons and boney structure about a turkey leg or jam the knives.

SUMMARY OF INVENTION

The present invention comprises an automated machine for removing the meat from the leg of a fowl, such as a turkey. The invention is herein described with respect to the stripping of meat from turkey legs though it is clearly applicable to other fowl. The machine hereof includes means for gripping a turkey leg immediately behind the hocks or ankle joint so as to firmly hold the leg bone, and at the same time, grip the tendons of the leg at the lower extremities thereof. The present invention further includes a stripping unit which is moveable longitudinally of the leg bone and which has radially moveable stripping knives. The stripping unit is driven as by pneumatic or hydraulic pressure, and a cam surface is provided along the direction of movement for engagement by a cam follower on the stripping unit to radially adjust the position of the knives in accordance with the general contour of the leg bones from which meat is being stripped.

The present invention operates to grip the bone and tendons, so that the meat is stripped from both bones and tendons. The knives of the stripping unit are automatically moved radially as the unit moves longitudinally of the bone and are each particularly formed for maximized stripping action from both bone and tendons. Operation of the invention is substantially automatic with hydraulic cylinders, for example, actuating the bone and tendon gripping means and the stripping means in a predetermined sequence. An operator need only place a turkey leg, for example, in a machine and press an actuator element. The machine then automatically strips the meat from bone and tendon and returns to original position. The operator only removes the stripped bone and inserts another leg in the machine, so that a very rapid and highly efficient stripping action is achieved.

DESCRIPTION OF FIGURES

The present invention is illustrated as to a single embodiment in the accompanying drawings, wherein;

FIG. 6 is a partial side elevational view showing the stripping unit and mounting thereof;

FIG. 7 is a central sectional view of the stripping unit taken in the plane 7—7 of FIG. 6;

DESCRIPTION OF PREFERRED EMBODIMENT

Figure 1:
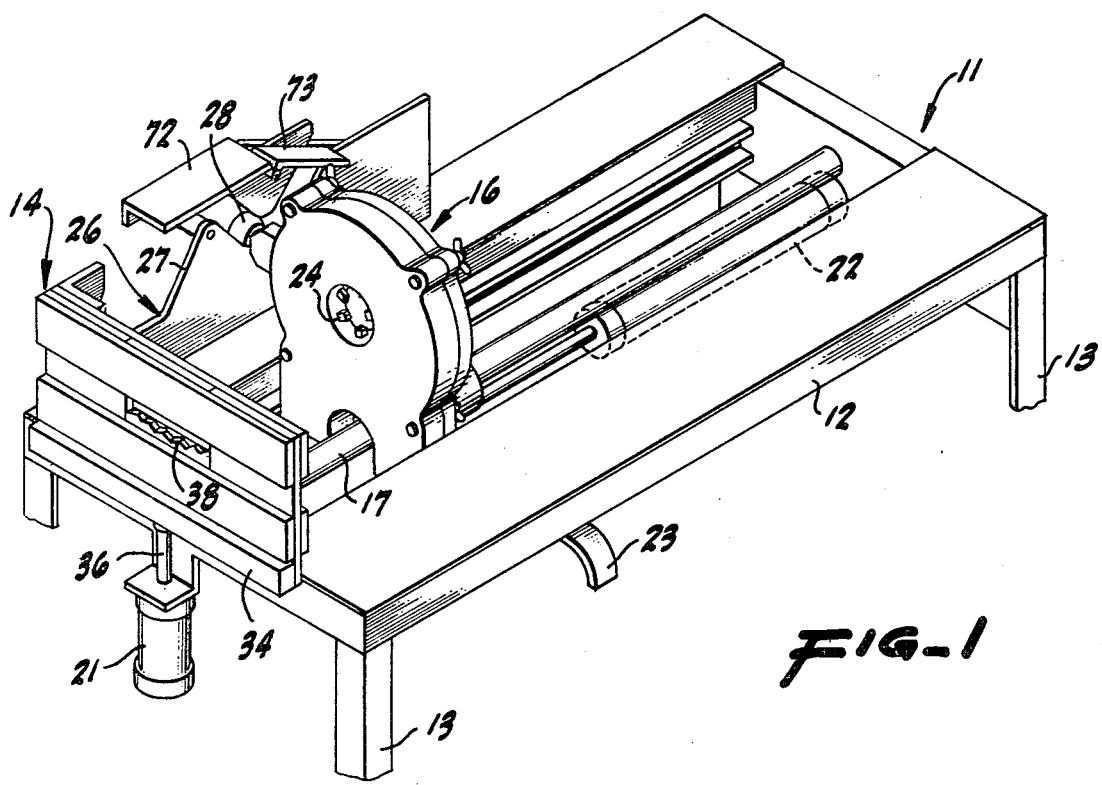
FIG. 1 is a perspective view of a machine in accordance with the present invention.

The present invention as illustrated in the accompanying drawings comprises a machine 11 having a frame 12 which may be supported by legs 13 and which carries at one end a gripping unit 14 for removeably engaging a turkey leg or the like, immediately behind the hock thereof, as further described below. The machine further includes a stripping unit 16 mounted for movement longitudinally of the frame 12 along a central shaft 17 for reciprocal motion relative to the gripping means 14. The gripping means and stripping unit are driven by power cylinders 21 and 22, respectively, suitably mounted in the frame and operated by a control lever 23, which may, for example, be configured and mounted for knee operation by an operator of the machine. In the preferred embodiment of the present invention herein described, it is assumed that hydraulic cylinders 21 and 22 are employed, although it will, of course, be appreciated that pneumatic cylinders or electrical drive means may also be utilized. The stripping unit 16 includes a plurality of moveable stripping knives 24 and radial positioning thereof is controlled by a cam unit 26 having a particularly configured cam surface 27 thereof engaged by a cam follower 28 of the stripping unit. The cam unit 26 extends longitudinally of the machine along the traverse of the stripping unit and provides for moving the stripping knives 24 radially, in order to follow the configuration of a bone, such as a turkey leg bone from which meat is to be stripped by the stripping knives 24.

Figure 4:
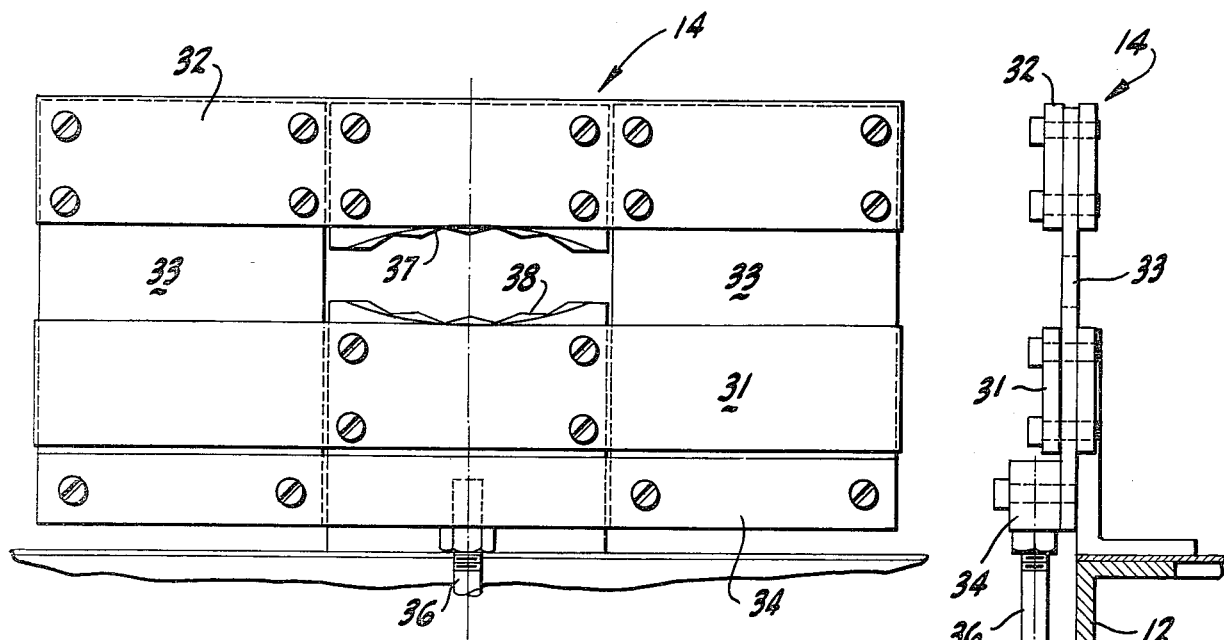
FIG. 4 is an elevational view showing the gripping means of the present invention.
Figure 5:
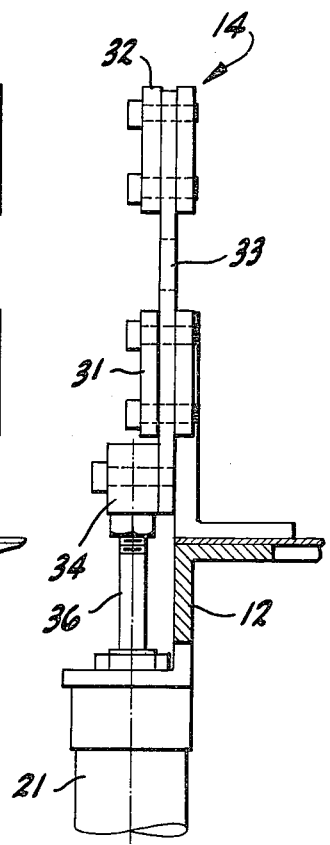
FIG. 5 is a side elevational view of the gripping means of FIG. 4.

Considering now the individual elements of the present invention in somewhat greater detail, it is noted that the gripping means 14 of the present invention, as further shown in FIGS. 4 and 5 of the drawings, includes a lower stationary block 31 mounted upon the frame 12, for example, and an upper moveable block 32 carried by a pair of slide plates 33 extending in sliding relationship through the lower block 31 into engagement with a transverse slide bar 34 which is connected to a vertically reciprocal piston rod 36 of the hydraulic cylinder 21. The stationary block 31 and moveable block 32 of the gripping means 14 includes centrally located gripping elements 37 and 38 adapted to grasp or grip a bone and tendons thereabout as these blocks are moved together by the power cylinder 21.

Figure 8:
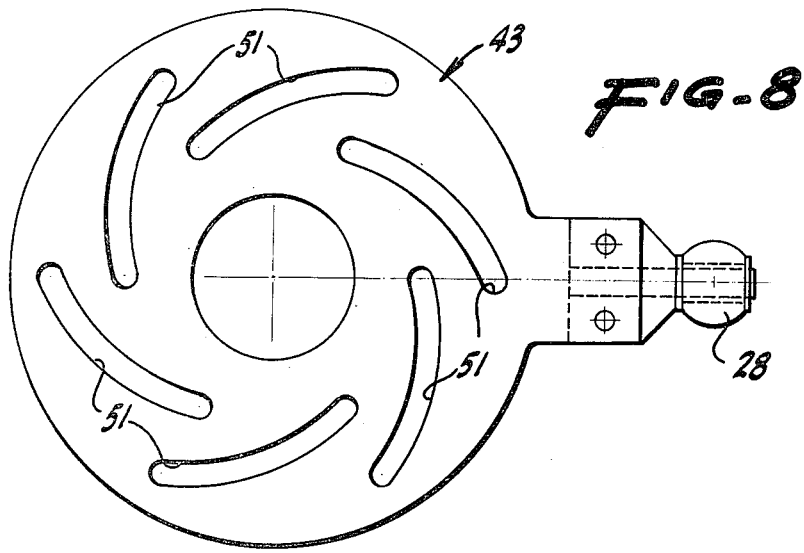
FIG. 8 is a plan view of the cam plate of the stripping unit.
Figure 11:
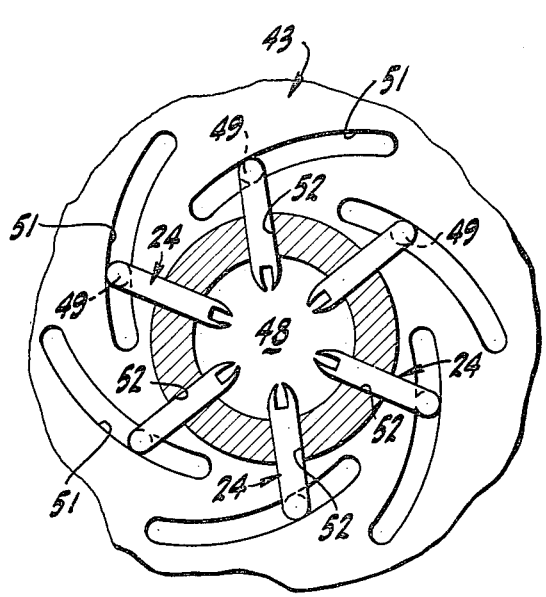
FIG. 11 is a partial sectional view of the stripping unit taken in the plane 11—11 of FIG. 7.

Considering further details of the present invention, and particularly, the stripping unit 16, it is noted that this unit is mounted for reciprocal motion longitudinally of the machine of the present invention upon the shaft 17 extending lengthwise of the frame 12. The stripping unit is formed primarily of three elements, including a front casing 41, a back plate 42, and a central cam plate 43, which is separately illustrated in FIG. 8. The forward casing 41 and back plate 42 are bolted together as by means of bolts 46 extending through mating lugs 47 on these elements, and the cam plate 43 is disposed within a recess in the housing element 41 between the elements 41 and 42. A slot in a side of the housing element 41 accommodates extension of the cam follower 28 from the cam plate 43 exteriorly of the stripping unit 16.

The back plate 42 has a conical depression in the outer surface, as shown in FIG. 7, and the cam plate 43 also has a conical depression on the rear face thereof so that the stripping unit presents a concave surface to the meat being stripped from a bone.

The elements 41, 42 and 43 of the stripping unit are each provided with a large circular central opening 48 therethrough, and a plurality of stripping knives 24 extend into this opening. In the illustrated embodiment of the present invention there are provided six stripping knives, although it will be appreciated that this number may be varied. Each of these stripping knives 24 are provided with a lateral extension 49 at the rear end thereof for fitting into a cam slot 51 in the cam plate 43.

The stripping knives 24 extend radially into the opening 48 and are slidably disposed in radial slots 52 on the inner surface of the front plate 41, so that the knives are radially moveable in the stripping unit as the cam plate 43 is angularly adjusted. The cam slots 51 in the cam plate 43 are shown to have a slightly curved configuration and each of these slots are shown with the same curvature. It will be appreciated that the shape of these cam slots may be varied and also that certain of the slots may have a different configuration than other slots if it is desired to move some of the stripping knives differently from the remainder as the cam plate is turned or angularly adjusted by the cam follower 28 thereon. It will also be appreciated that angular movement of the cam plate will move the stripping knives 24 radially inward and outwardly of the opening 48 through the stripping unit.

Figure 9:
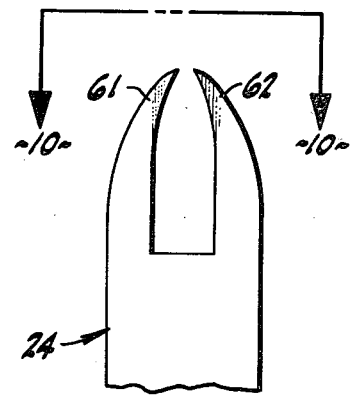
FIG. 9 is a partial side elevational view of a stripping knife of the stripping unit.
Figure 10:
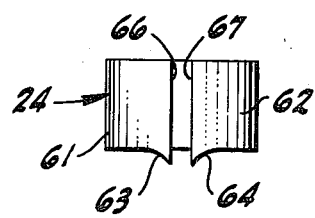
FIG. 10 is a top end view of the knife of FIG. 9.

Before proceeding with a description of the movement of the stripping knives of the stripping unit 16, it is noted that these knives are particularly formed to accomplish the meat stripping action of the present invention. Referring to FIGS. 9 and 10 in this respect, it is noted that each of the knives 24 are formed with a pair of forwardly extending prongs or the like 61 and 62, which are each formed with a curved configuration toward each other at the center line of the knife and are undercut internally of the knife structure, as illustrated in FIG. 9. In addition, each of these knife prongs 61 and 62 have an outwardly curved upper leading edge facing away from the gripping means 14 which come to sharp points at the adjacent surfaces of the prongs, as illustrated in FIG. 10. The curved leading edges 63 and 64 of the knife prongs 61 and 62 are sharpened, and similarly, the parallel adjacent edges 66 and 67 of these prongs are sharpened, so that they will cut meat engaged thereby. It will be appreciated that the above-described knife configuration is particularly adapted to the stripping of meat from the bone and about the tendons of a turkey leg, for example.

Figure 3:
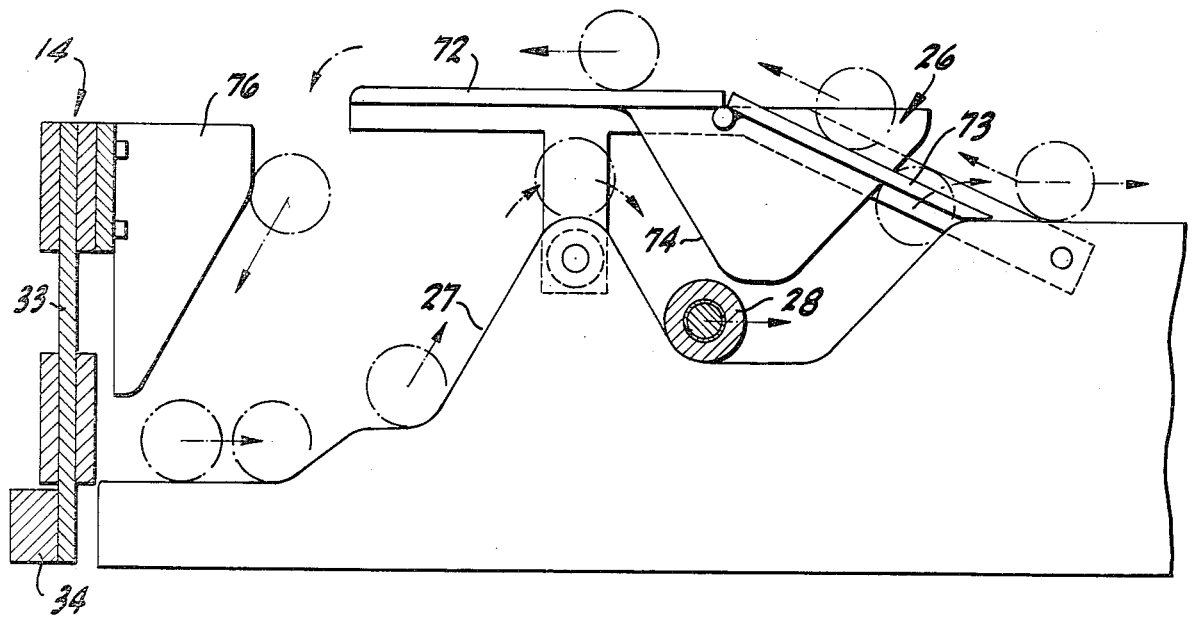
FIG. 3 is an enlarged side elevational view of the cam unit of the present invention taken in the plane 3—3 of FIG. 2.

Considering now the cam unit 26 which is provided for the purpose of operating the cam plate 43 to the end of radially positioning the stripping knives as the stripping unit 16 is moved longitudinally of a bone, such as a turkey leg, particular reference is made to FIG. 3. The cam element 26 is shown to include a plate 71 having an upper cam surface 27, upon which the cam follower 28 is adapted to ride as the stripping means 16 is moved longitudinally of the machine. It will be seen that the cam surface is initially quite low adjacent to the gripping means 14, so that the cam follower 28 is pointed downward, and this causes the stripping knives 24 to extend very substantially into the opening 48 in the stripping means. The bone of a turkey leg is of a minimum diameter immediately behind the hocks thereof, and the present invention is set to place the knives substantially in engagement with the bone immediately behind the hocks when the stripping means is adjacent the gripping means. The cam surface 27 rises from this initial low point, so that the cam follower moving therealong will rotate the cam plate 43 to move the knives radially outward. The cam surface 27 arises to a peak which is aligned with the knuckle of the turkey leg bone connecting the leg and thigh bones. The cam surface then extends downwardly from this peak to an intermediate level along the thigh bone and back up in line with the joint at the upper end of the thigh bone. The cam element 26 further includes a return bar or track 72 mounted above the plate 71 and having a hinged rear portion 73 normally resting on the rear high portion of the cam surface 27. As the cam follower 28 moves upwardly to this rear high portion of the cam surface 27, it will pivot the rear portion of the return bar 73 upwardly and this portion will then fall back down into the illustrated position as the cam follower passes same. As the stripping unit 16 is then returned to engagement with the gripping means, the cam follower 28 will ride upon the return bar 72 so that the stripping knives 24 remain retraced during the return stroke of the machine. The cam return also includes a depending plate 74 above the thigh bone depression of the cam surface 27 for the purpose of forcing the cam follower downwardly to follow the surface 27 past the peak for the knuckle between the leg bone and thigh bone. There is also provided a cam return block 76 mounted at or on the gripping means 14 in line with the end of the return bar 72 of the cam unit for engaging the cam follower as the stripping means is moved forwardly into engagement with the gripping means for forcing the cam follower downwardly into engagement with the lower portion of the cam surface 27. This cam return block has a downwardly curving surface facing the remainder of the cam element, so as to smoothly engage the cam follower and move same downwardly to rotate the cam plate and to move the stripping knives inwardly of the stripping unit.

It will be appreciated that the cam surface 27 of the present invention is disposed alongside the bone from which meat is to be stripped with the peaks and valleys of the cam surface aligned with knuckles and bones of the leg and thigh, respectively. It is to be noted that the present invention may be formed with only the forward part of the cam surface 27 under those circumstances, wherein the thigh bone is not to be stripped of meat. Some stripping operations are employed only on leg bones and other are employed for both leg and thigh bones. Similarly, it is possible to employ the present invention only to strip thigh bones, and for such an application, the cam unit may be formed only with the rear portion of the cam surface. It is also recognized that turkeys of varying sizes are available, however, turkeys of a particular size are generally operated upon same time, and a different cam element may be substituted if turkey legs of a substantially different size are to be stripped.

The stripping unit 16 of the present invention is mounted for reciprocal motion relative to the gripping means 14, and this mounting may take the form of a sleeve 81, as shown in FIG. 6 which is bolted to the underside of the stripping unit 16 and which slidably engages the longitudinal shaft 17. The sleeve 81 has a clevis 82 extending beneath same for pivotal attachment to a piston rod 83 of the hydraulic cylinder 22. The sleeve 81 also carries a transverse bar 84 as by bolted engagement with a sleeve flange and wheels 86 are rotatably mounted on this bar 84 for rolling engagement with the underside of a pair of longitudinal tracks 87. It will be seen that actuation of the hydraulic cylinder 22 will move the stripping unit 16 longitudinally of the device along the shaft 17.

Figure 2:
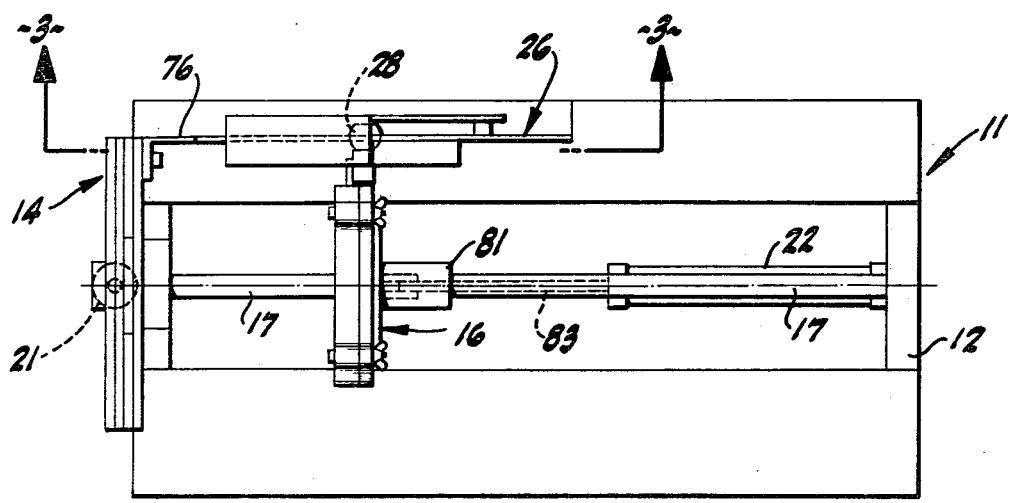
FIG. 2 is a top plan view of the machine of FIG. 1.

Operation of the present invention may be substantially automatic with an operator being required only to insert a turkey leg, for example, and to remove the stripped bone prior to the next stripping operation. The control lever 23 may be arranged to operate in a variety of different ways as, for example, by movement of same to the left or right from a central neutral position. After the meat has been stripped from a bone and attached tendons, the stripping unit 16 is actuated to return to the gripping means, and during this return travel, the stripping knives are retracted by the cam follower riding on the upper cam bar or rail 72 and the gripping means are opened by operation of the cylinder 21, so that operator need only withdraw the turkey leg from the machine and insert another leg in the machine as the stripping means is moving to the left in FIGS. 1 and 2. As the stripping means reaches approximately the end of this return travel, the cam follower 28 will strike the cam block 76 to rotate the cam plate and move the stripping knives inwardly. At this time the gripping means are also closed to firmly grip the turkey leg, for example, immediately behind the hocks thereof, and thus also to firmly grip the leg tendons. Further operation of the machine by the lever 23 causes the stripping unit 16 to move to the right with the radial position of the stripping knives 24 being set by the cam follower 28 riding upon the cam surface 27. The meat which is removed from the leg and tendons may be dropped into a container or onto a conveyor belt and the stripped bones may be similarly disposed, so that only a minimum amount of handling is required by an operator and then almost automatic stripping operation results. The particular configuration of stripping knives described above, and illustrated in FIGS. 9 and 10 of the drawings, is particularly advantageous in removing or stripping meat from bones and tendons, and it is noted that the primary movement of knives is longitudinally of the bone and tendons although radial adjustment of knives' position is herein provided. The inner ends of the knives are intended to be disposed as close as possible to the bone itself, and appropriate dimensioning of the cam surface 27 provides this result.

The present invention provides an improved machine for stripping meat from the legs of fowl, and although the present invention has been described with respect to a single preferred embodiment thereof, it will be appreciated by those skilled in the art, that numerous modifications and variations are possible within the scope of the present invention. Consequently, it is not intended to limit the present invention to the precise terms of description or details of illustration.

What is claimed is:

1. A meat stripping machine for fowl comprising
gripping means having moveable jaws for gripping a fowl leg bone and tendons immediately behind hocks,
a stripping unit having a plurality of radially moveable stripping knives and being mounted for movement longitudinally of the machine,
a cam unit defining a cam surface extending longitudinally of said machine,
cam follower means engaging said cam surface and operating said stripping knives for radially moving said knives in accordance with said cam surface as said stripping unit moves longitudinally of said machine, and
drive means for moving the jaws of said gripping means and moving said stripping unit longitudinally of the machine and a bone mounted therein.

2. The machine of claim 1 further defined by
a central longitudinal shaft,
means mounting said stripping unit on said shaft in longitudinally slidable relation thereto, and
said drive means including a power cylinder connected to the means mounting said stripping unit for controllably moving said stripping unit along said shaft.

3. The machine of claim 1 further defined by
said stripping unit including a rotary mounted cam plate having slots therein with a cam follower extending from said plate and means holding said knives in engagement with said cam plate slots whereby angular movement of the cam plate radially moves said knives.

4. The machine of claim 1 further defined by
said stripping knives each having a pair of forward extending prongs with the ends curved toward each other at adjacent sharpened edges.

5. The machine of claim 4 further defined by
said knives having a sharpened point extending from the front face thereof at the ends of each of said adjacent sharpened edges.

6. The machine of claim 1 further defined by
said cam surface having peaks and valleys aligned with larger and small bone size respectively, along the length of a bone to be stripped and an upper cam bar with means for receiving said cam follower unit thereon during return travel of said stripping unit to hold the stripping knives in radially outward retracted position.

* * * * *